United States Patent
Dale et al.

(10) Patent No.: US 12,242,876 B2
(45) Date of Patent: Mar. 4, 2025

(54) SYSTEM AND METHOD OF TIMEKEEPING FOR A VIRTUAL MACHINE HAVING MULTIPLE VIRTUAL PROCESSING CORES

(71) Applicant: The Boeing Company, Chicago, IL (US)

(72) Inventors: Timothy James Dale, St. Louis, MO (US); Glenn Alan Patterson, St. Louis, MO (US); Jonathan Nicholas Hotra, Maryland Heights, MO (US); Craig H. Sowadski, House Springs, MO (US)

(73) Assignee: The Boeing Company, Arlington, VA (US)

( * ) Notice: Subject to any disclaimer, the term of this patent is extended or adjusted under 35 U.S.C. 154(b) by 518 days.

(21) Appl. No.: 17/579,414

(22) Filed: Jan. 19, 2022

(65) Prior Publication Data

US 2022/0244978 A1    Aug. 4, 2022

Related U.S. Application Data (60) Provisional application No. 63/144,725, filed on Feb. 2, 2021.

(51) Int. Cl.
*G06F 9/455* (2018.01)
*G06F 9/48* (2006.01)
(52) U.S. Cl.
CPC ........ *G06F 9/45558* (2013.01); *G06F 9/4812* (2013.01); *G06F 2009/4557* (2013.01)
(58) Field of Classification Search
CPC .................................................. G06F 9/45558
USPC ............................................................ 718/1
See application file for complete search history.

(56) References Cited

U.S. PATENT DOCUMENTS

| | | | | |
|---|---|---|---|---|
| 7,503,039 B2* | 3/2009 | Inoue | ........................ | G06F 8/45 |
| | | | | 717/154 |
| 7,797,512 B1* | 9/2010 | Cheng | .................... | G06F 9/4825 |
| | | | | 712/10 |
| 7,802,073 B1* | 9/2010 | Cheng | .................... | G06F 9/3851 |
| | | | | 718/1 |

(Continued)

OTHER PUBLICATIONS

Canadian Intellectual Property Office, Office Action and Search Report Issued in Application No. 3,146,521, Feb. 12, 2024, 5 pages.

(Continued)

*Primary Examiner* — Mehran Kamran
(74) *Attorney, Agent, or Firm* — Alleman Hall & Tuttle LLP (57) ABSTRACT

A host computer for virtualizing a target multicore processor includes a host CPU and a host memory storing a virtual time object and a VM, the VM including target code. The host CPU executes the plurality of threads in parallel on corresponding virtual cores, including a first thread executing on a first virtual core and a second thread executing on a second virtual core. The VM assigns a designation to the first virtual core to increment the virtual time object by a first count of a first plurality of instructions executed in the first thread over a first duration. The VM moves the designation to the second virtual core in response to detecting an event that defines an end of the first duration. The second virtual core increments the virtual time object by a second count of instructions executed in the second thread over a second duration.

20 Claims, 4 Drawing Sheets

(56) References Cited

U.S. PATENT DOCUMENTS

| | | | | |
|---|---|---|---|---|
| 8,082,431 B2* | 12/2011 | Rothman | | G06F 9/4401 |
| | | | | 713/1 |
| 8,544,010 B2* | 9/2013 | Huang | | G06F 9/45558 |
| | | | | 718/1 |
| 9,003,405 B1* | 4/2015 | Hotra | | G06F 9/45533 |
| | | | | 718/1 |
| 9,396,013 B2* | 7/2016 | Moriki | | G06F 9/45558 |
| 9,778,943 B2* | 10/2017 | Tsirkin | | G06F 9/45533 |
| 10,162,658 B2* | 12/2018 | Nicholas | | G06F 9/45558 |
| 10,664,311 B1* | 5/2020 | Davgalev | | G06F 9/4812 |
| 2008/0244538 A1* | 10/2008 | Nair | | G06F 9/45554 |
| | | | | 717/137 |
| 2009/0164651 A1* | 6/2009 | Ooshima | | G06F 15/16 |
| | | | | 709/230 |
| 2009/0300637 A1* | 12/2009 | Ringseth | | G06F 9/4881 |
| | | | | 718/104 |
| 2010/0077394 A1* | 3/2010 | Wang | | G06F 9/4812 |
| | | | | 718/1 |
| 2010/0235585 A1* | 9/2010 | Dowlatkhah | | G06F 16/256 |
| | | | | 711/E12.001 |
| 2013/0160012 A1* | 6/2013 | Ganguly | | G06F 9/45533 |
| | | | | 718/1 |
| 2014/0089616 A1* | 3/2014 | Shanbhogue | | G06F 12/1441 |
| | | | | 711/E12.091 |
| 2014/0149979 A1* | 5/2014 | Tsirkin | | G06F 9/45533 |
| | | | | 718/1 |
| 2014/0359608 A1* | 12/2014 | Tsirkin | | G06F 9/45533 |
| | | | | 718/1 |
| 2014/0372786 A1* | 12/2014 | Wohlgemuth | | G06F 1/3243 |
| | | | | 713/502 |
| 2015/0121384 A1* | 4/2015 | Sato | | H04W 52/0251 |
| | | | | 718/102 |
| 2015/0324403 A1* | 11/2015 | Xiao | | G06F 16/21 |
| | | | | 707/722 |
| 2015/0339170 A1* | 11/2015 | Guan | | G06F 9/45558 |
| | | | | 718/104 |
| 2016/0077845 A1* | 3/2016 | Earl | | G06F 9/4856 |
| | | | | 718/1 |
| 2016/0085572 A1* | 3/2016 | Hotra | | G06F 9/4887 |
| | | | | 718/1 |
| 2016/0139942 A1* | 5/2016 | Tsirkin | | G06F 9/45558 |
| | | | | 718/1 |
| 2017/0250869 A1* | 8/2017 | Voellmy | | H04L 43/14 |
| 2017/0286152 A1* | 10/2017 | Matsumoto | | G06F 9/4825 |
| 2018/0357089 A1* | 12/2018 | Tsirkin | | G06F 11/3442 |
| 2019/0004866 A1* | 1/2019 | Du | | G06F 9/5066 |
| 2021/0057085 A1* | 2/2021 | Dellimore | | G08B 21/182 |
| 2021/0334125 A1* | 10/2021 | Xiao | | G06F 9/485 |
| 2022/0206840 A1* | 6/2022 | Xu | | G06F 9/45533 |
| 2022/0244978 A1* | 8/2022 | Dale | | G06F 9/4887 |

OTHER PUBLICATIONS

Babu, Vignesh, et al.; Precise Virtual Time Advancement for Network Emulation; SIGSIM-PADS '10; Jun. 15-17, 2022, pp. 175-186.

Extended Search Report and Written Opinion issued in application serial No. 22153443.1 dated Jun. 21, 2022; pp. 1-8.

* cited by examiner

SYSTEM AND METHOD OF TIMEKEEPING FOR A VIRTUAL MACHINE HAVING MULTIPLE VIRTUAL PROCESSING CORES

CROSS REFERENCE TO RELATED APPLICATIONS

This application claims priority to U.S. Provisional Patent Application No. 63/144,725 filed on Feb. 2, 2021 for a System and Method of Timekeeping for a Virtual Machine Having Multiple Virtual Processing Cores, the entire contents of which are hereby incorporated herein by reference.

FIELD

The field of the disclosure relates generally to virtualization of multicore processors and, more specifically, to tracking virtual time in a virtual machine having multiple virtual cores processing in parallel.

BACKGROUND

Computing systems are often virtualized, or emulated, to enable simulation, testing, and development of that computing environment on a host computer, such as a desktop personal computer. Virtualization refers to the imitation of a given unit of hardware by a software program, such as a virtual machine (VM), executing on a local, or host, computer via a hypervisor. In some instances, VMs execute without a hypervisor. Virtualization enables development, testing, and execution of target software without the need for a complete target computing system, which may have limited availability.

At least some of those computing systems utilize a multicore processor and multi-thread, or parallel, processing of target software. In some instances, multiprocessing hardware is used instead of, or in combination with, multicore processors to provide multiple processor cores for parallel execution. When that target software includes multiple threads, tasks, and/or processes intended to execute in parallel on a multicore processor or on multiple processors, execution of that target software and, more specifically, the multiple threads on multiple virtual cores demands that the threads be synchronized or coordinated in some manner. One solution is to execute the threads serially in an incremental manner, e.g., from interrupt to interrupt. However, this results in degradation of the VM's performance, particularly as the number of threads and target processing cores increases. Another solution is to synchronize virtual time, i.e., the timing within the VM, with "wall clock" time, i.e., actual time in the physical world, however, if the virtualized system cannot execute software fast enough to match wall clock time, then it is often not possible to achieve synchronization, which can be the case when processor emulation is used in the virtual machine. In other scenarios, it is desirable to run faster than wall clock time, and in this scenario wall clock time cannot easily be used as a time source and a synchronized virtual time source is required. Moreover, these conventional solutions result in an inability to produce VMs that match the desired performance characteristics for multicore applications using VMs such as test environments and trainers. Accordingly, improved timekeeping for VMs having multiple virtual processing cores is desired.

For the purpose of this disclosure, the terms "virtualization" and "emulation" are used interchangeably to refer to a VM where any aspect of target hardware is being emulated, although the host computer may incorporate one or more other aspect of target hardware.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is directed to a host computer for virtualizing a target multicore processor. The host computer includes a host memory and a host CPU. The host memory includes a first section of memory storing a virtual time object, and a second section storing a VM. The VM includes target code having a plurality of threads, wherein each thread includes a plurality of instructions configured to execute on the target multicore processor. The host CPU is configured to execute the VM to virtualize the target multicore processor. The VM is configured to execute the plurality of threads in parallel on corresponding virtual cores, including a first thread having a first plurality of instructions executing on a first virtual core and a second thread having a second plurality of instructions executing on a second virtual core. The VM is further configured to assign a designation to the first virtual core to increment the virtual time object by a first count of the first plurality of instructions executed in the first thread over a first duration. The VM is further configured to move the designation to the second virtual core in response to detecting an event that defines an end of the first duration. The VM is further configured to increment, by the second virtual core, the virtual time object by a second count of the second plurality of instructions executed in the second thread over a second duration.

Another aspect is directed to a method of tracking virtual time in a VM having a virtual multicore processor. The method includes executing a first thread on a first virtual core, wherein the first thread includes a first plurality of instructions. The method includes executing a second thread on a second virtual core in parallel with the first thread, wherein the second thread includes a second plurality of instructions. The method includes storing a virtual time object in a section of host memory. The method includes assigning a designation to the first virtual core to increment the virtual time object by a first count of the first plurality of instructions executed in the first thread over a first duration. The method includes moving the designation to the second virtual core in response to detecting an event that defines an end of the first duration. The method includes incrementing, by the second virtual core, the virtual time object by a second count of the second plurality of instructions executed in the second thread over a second duration.

Yet another aspect is directed to a computer-readable memory storing a VM having a plurality of virtual cores. The VM, upon execution by a host CPU, is configured to execute a first thread on a first virtual core of the plurality of virtual cores, wherein the first thread includes a first plurality of instructions, and execute a second thread on a second virtual core, of the plurality of virtual cores, in parallel with the first thread, wherein the second thread includes a second plurality of instructions. The VM stores a virtual time object in a section of host memory, and assigns a designation to the first virtual core to increment the virtual time object by a first count of the first plurality of instructions executed in the first thread over a first duration. The VM moves the designation to the second virtual core in response to detecting an event that defines an end of the first duration. The second virtual core increments the virtual time object by a second count of the second plurality of instructions executed in the second thread over a second duration.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Corresponding reference characters indicate corresponding parts throughout the several views of the drawings. Although specific features of various examples may be shown in some drawings and not in others, this is for convenience only. Any feature of any drawing may be referenced and/or claimed in combination with any feature of any other drawing.

DETAILED DESCRIPTION

The host computer disclosed provides a virtual time object stored in a memory section such that it can be used in the virtualization layer by multiple virtualized cores of the VM. The virtual time object may include, for example, a variable, data structure, or class in which virtual time can be stored. When executing target code having multiple threads executed in parallel, the VM designates one virtual core as the timekeeper to increment the virtual time object by a count of its instructions executed, and then the VM moves the designation to another virtual core that, likewise, increments the virtual time object by its count of its instructions executed. The designation may include a variable, data structure, class, Boolean, flag or other read/write software structure that can identify a given virtual core as the timekeeper. The designation of timekeeper may be moved, for example, in response to detecting an event, such as an interrupt or completion of execution of a translation block of code.

A translation block is created when processor emulation is used within a VM. Translation blocks improve performance of processor emulation. In direct processor emulation (i.e., without translation blocks), every instruction in the target software is encountered logic in the processor emulation, and the VM translates that target software (e.g., assembly or machine code) to host code (e.g., host assembly or machine code). Translation blocks enable blocks of target software to be translated and cached for future use during execution. This caching is possible because the target software binary does not change and most software is cyclic in nature and only executes a small percentage of all overall code in the binary. Translation blocks are variable in length and are designed to end at some transition in the code, such as, for example, a branch statement or a context switch. These transitions in the code cause the translation block being worked on in the processor emulator to be moved out and a new translation block loaded into the processor emulator. The transition of translation blocks is conceptually similar to context switches.

Figure 1:
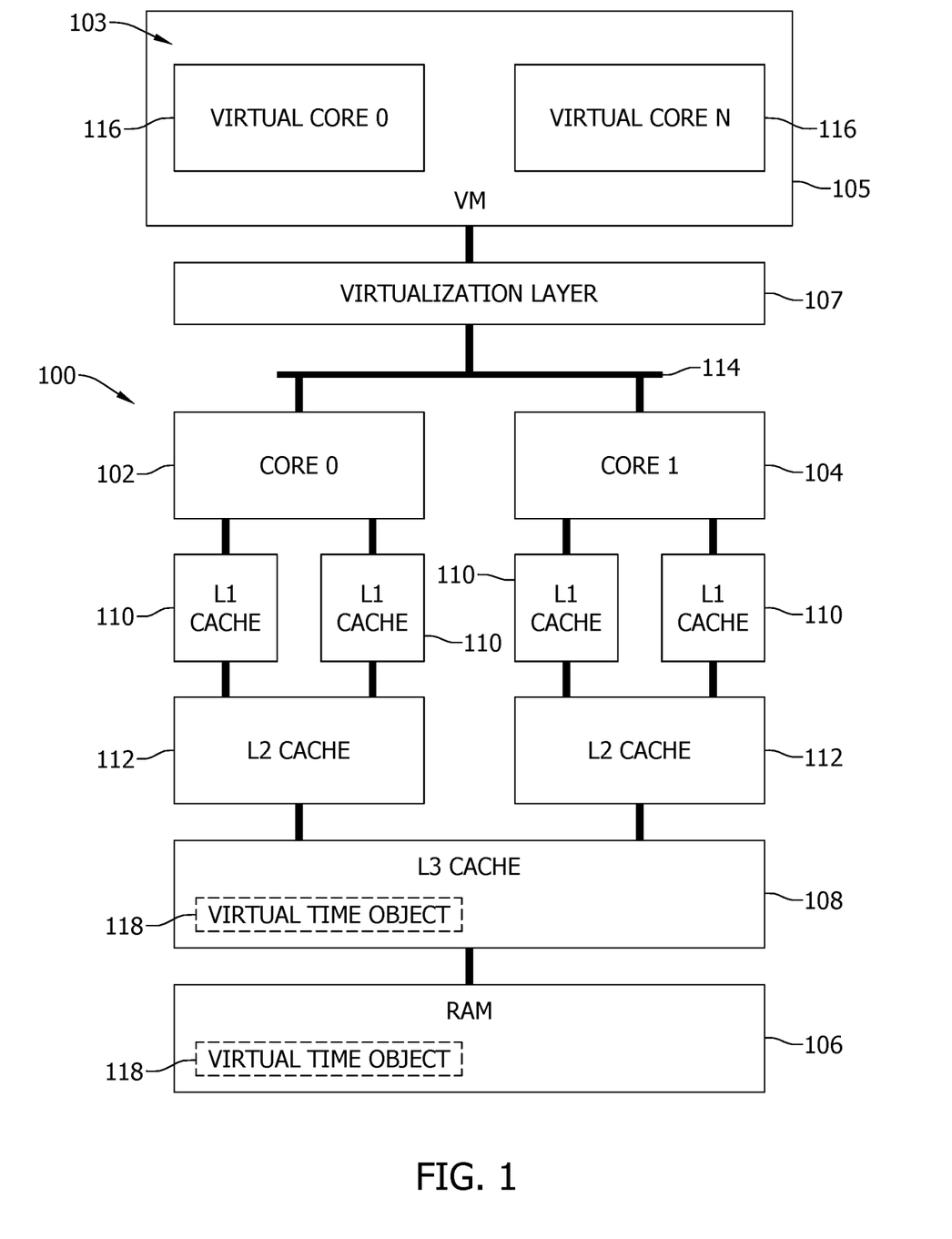
FIG. 1 is a block diagram of an example memory structure for a host computer executing a VM.
Figure 2:
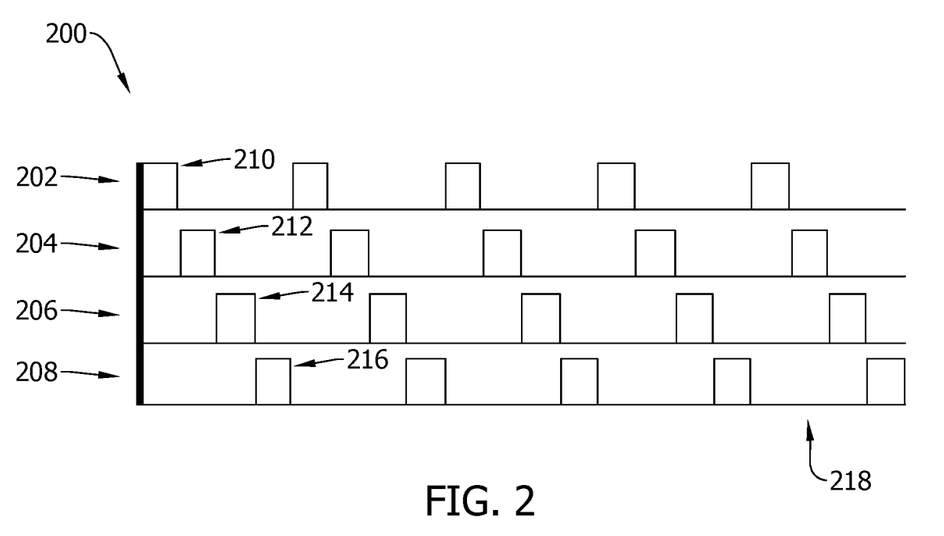
FIG. 2 is an example timing diagram of serial processing of multi-threaded target code.
Figure 3:
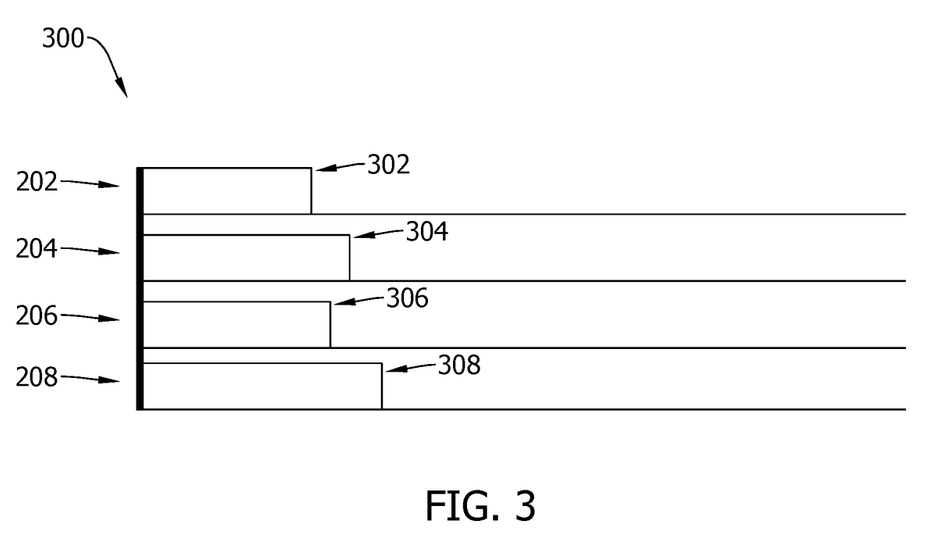
FIG. 3 is an example timing diagram of parallel processing of multi-threaded target code.

FIG. 1 is a block diagram of an example memory structure for a host computer having a host central processing unit (CPU) 100, having one or multiple cores. Referring to the example shown in FIG. 1, host CPU 100 includes at least two cores including a core 0 102 and a core 1 104. Host CPU 100 is configured, or programmed, to execute a VM 105 using a virtualization layer 107. VM 105 is configured to execute target code, or software, having multiple threads, tasks, and/or processes that may be processed serially or in parallel on a target multicore processor. VM 105 includes a virtual multicore processor 103 having N virtual cores 116. FIG. 2 is an example timing diagram 200 of serial processing of the multi-threaded target code. FIG. 3 is an example timing diagram 300 of parallel processing of the multi-threaded target code. FIG. 2 illustrates four threads executing serially on respective virtual cores 202, 204, 206, 208. Sections of code 210, 212, 214, 216 in each thread execute sequentially on virtual cores 202, 204, 206, 208 over virtual time, which is represented on a virtual time axis 218. Notably, the time required to execute the four threads serially is a factor of four longer than executing the same threads in parallel, as shown in FIG. 3. However, timekeeping can simply progress serially with the threads in virtual time.

In FIG. 3, timing diagram 300 illustrates the same virtual cores 202, 204, 206, 208 processing the same target code 302, 304, 306, 308 in parallel. Each target code 302, 304, 306, 308 include a unique set of executable instructions that vary in the time necessary to process by their respective virtual cores 202, 204, 206, 208. Virtual cores 202, 204, 206, 208 process in parallel and track virtual time with a virtual time object, and without synchronizing virtual time with wall-clock time. Because each thread of target code 302, 304, 306, 308 is unequal in its time required for execution of instructions, timekeeping is distributed among all virtual cores 202, 204, 206, 208. Notably, parallel-executed threads are often interdependent and must occasionally halt and wait for another thread to catch up or for a shared resource to become available. Although FIG. 3 illustrates four virtual cores, the disclosed timekeeping method may be embodied in a virtualized multicore processor having any number, N, of virtual cores, i.e., two or more.

Referring to host CPU 100 shown in FIG. 1, the virtual time object 118 is stored in a section of memory accessible by virtualization layer 107 for use by all virtual cores 116 in VM 105, from virtual core 0 116 to virtual core N 116. The memory space may include, for example, an address in random access memory (RAM) 106. The target code itself, including its multiple threads, each composed of multiple executable instructions, may also be stored in RAM 106. Alternatively, target code may be stored in another memory space, such as a non-volatile RAM (NVRAM) or a mass storage device.

Alternatively, the memory space storing the virtual time object 118 may include an address in a shared cache, such as a layer 3 (L3) cache 108. Generally, each host core has one or more dedicated cache memory spaces. The dedicated cache may include, for example, one or more layer 1 (L1)

cache 110 and one or more layer 2 (L2) cache 112. Each additional layer of cache memory is generally larger and slower than the next lower level. For example, L1 cache 110 is typically the smallest volume of memory, but the fastest. L2 cache 112 is typically larger than L1 cache 110, but has slower read and write times. Likewise, L3 cache 108 is even larger, but again has slower read and write times. In certain embodiments, one or more of the dedicated cache memories (L1 110 or L2 112) is incorporated with its corresponding host core, e.g., core 0 102 or core 1 104. In alternative embodiments, the virtual time object 118 may be stored in another memory space coupled to the host cores over, for example, a memory bus 114.

For each virtual core 116, for example, virtual core 0 116 and virtual core N 116, VM 105 tracks virtual time by counting the number of emulated instructions executed and then incrementing the virtual time object 118. However, only one virtual core can increment, or advance, the virtual time object 118 at a given moment in time, because that one core locks the memory space, e.g., L3 cache 108. Consequently, one or more other virtual cores may stop processing its thread to preserve cache coherency, resulting in degraded performance of virtualized multicore processor 103. As the number of virtual cores increases, cache coherency issues compound. Moreover, one virtual core increments virtual time, because virtual time advances too quickly (e.g., faster than wall-clock time) when all threads increment virtual time. For example, a virtual processor with N cores advances virtual time N-times faster than with a single core or serially executing cores.

The VM 105 designates, or assigns a designation to, a first virtual core, e.g., virtual core N 116, to increment the virtual time object 118 by its count of the instructions executed in its thread of target code over a first duration. The designation is then moved to another virtual core 116 in response to detecting an event that defines an end of the first duration. That virtual core 116 then increments the virtual time object 118 by its count of instructions executed in its thread of target code over a second duration. All virtual cores otherwise execute their respective threads in parallel and only the designated virtual core increments the virtual time object 118.

The instructions, i.e., the target code, executed in a given thread by a corresponding virtual core may include, for example, a block of assembly language instructions. Those instructions may also include instructions to read the virtual time object 118 from time to time, e.g., periodically, which functions to synchronize the multiple threads and their corresponding virtual cores. Alternatively, the VM 105 may periodically instruct each virtual core to read the virtual time object 118.

The designation of timekeeper is moved in response to an event, such as an interrupt, the completion of execution of a translation block of instructions, or the halting of the virtual core that holds the designation of timekeeper. The moving designation avoids locking the shared memory space, which can cause one or more virtual cores 116 to halt execution. Although processing loads of the virtual cores 116 are often unequal, or unbalanced, at a given moment in time, over a longer duration, as each virtual core 116 contributes to the incrementing, or advancing of virtual time, the unequal processing loads across the virtual cores 116 are smoothed, or tend toward average.

Figure 4:
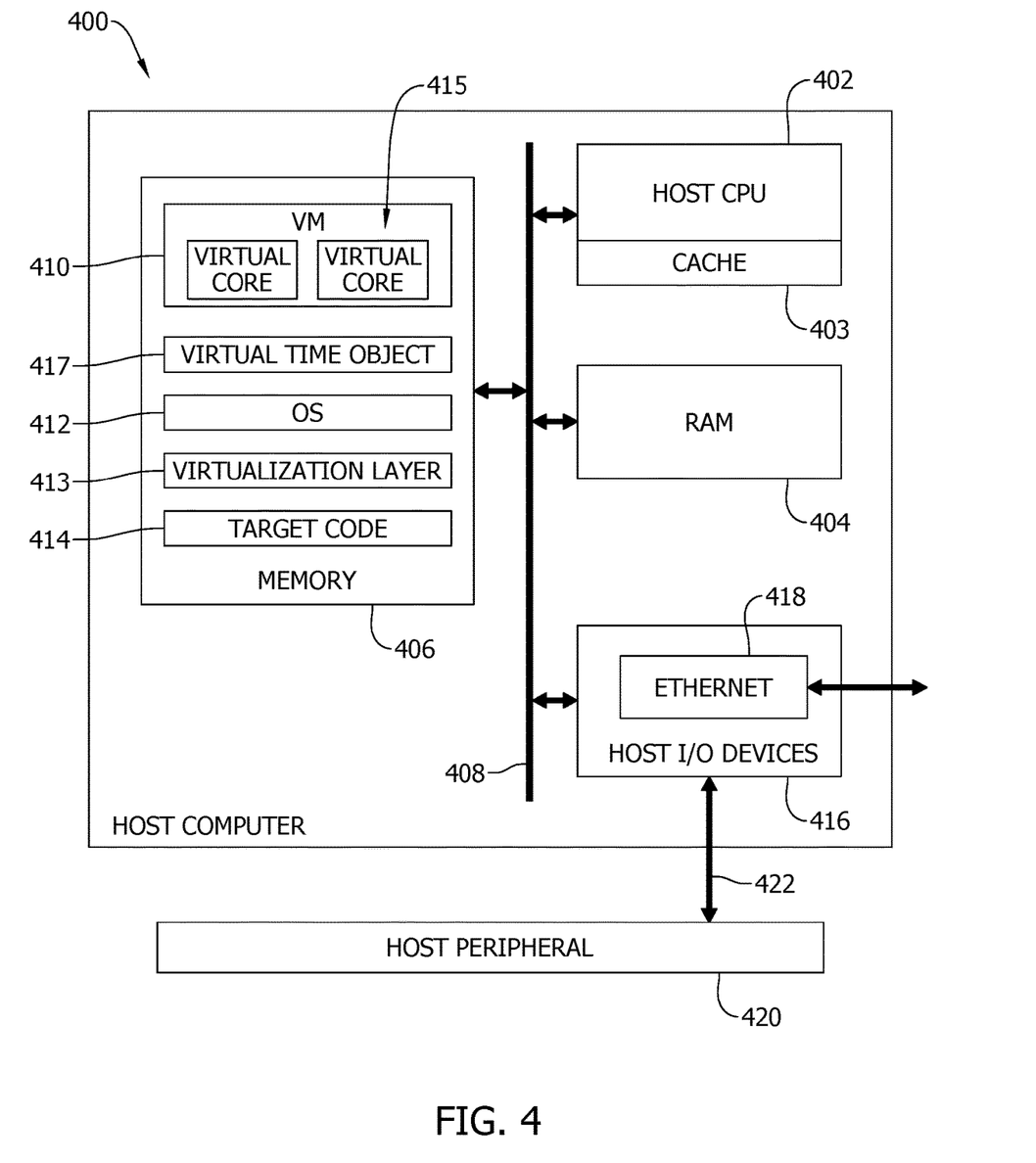
FIG. 4 is a block diagram of an example host computer.

FIG. 4 is a block diagram of an example host computer 400 for emulating a target multicore processor. The target multicore processor is a hardware multi-core processor to be emulated. For example, a computing system, i.e., the target hardware, may utilize a dual-core or quad-core processor. Alternatively, the target multicore processor may include eight or more processing cores. Generally, the target multicore processor includes two or more processing cores. Host computer 400 includes host CPU 402 coupled to a cache memory 403, and further coupled to RAM 404 and host memory 406 via a memory bus 408. Cache memory 403 and RAM 404 are configured to operate with host CPU 402 as multicore processor 100 operates with RAM 106 and the corresponding cache memory shown in FIG. 1. More specifically, the virtual time variable is stored in a memory space allocated in RAM 404 or in cache memory 403. Host memory 406 is a computer-readable memory (e.g., volatile or non-volatile) that includes a memory section storing a VM 410, a section storing an OS 412, a section storing a virtualization layer 413, a section storing target code 414, and a section storing a virtual time object 417, such as a variable, a data structure, or a class. In alternative embodiments, one or more section of host memory 406 may be omitted and the data stored remotely. For example, in certain embodiments, target code 414 may be stored remotely on a server or mass-storage device, and made available over a network to host CPU 402 and VM 410. VM 410 includes virtualized multicore processor 415.

Host computer 400 also includes host I/O devices 416, which may include, for example, a communication interface such as an Ethernet controller 418, or a peripheral interface for communicating with a host peripheral device 420 over a peripheral link 422. Host I/O devices 416 may include, for example, a GPU for operating a display peripheral over a display link.

Figure 5:
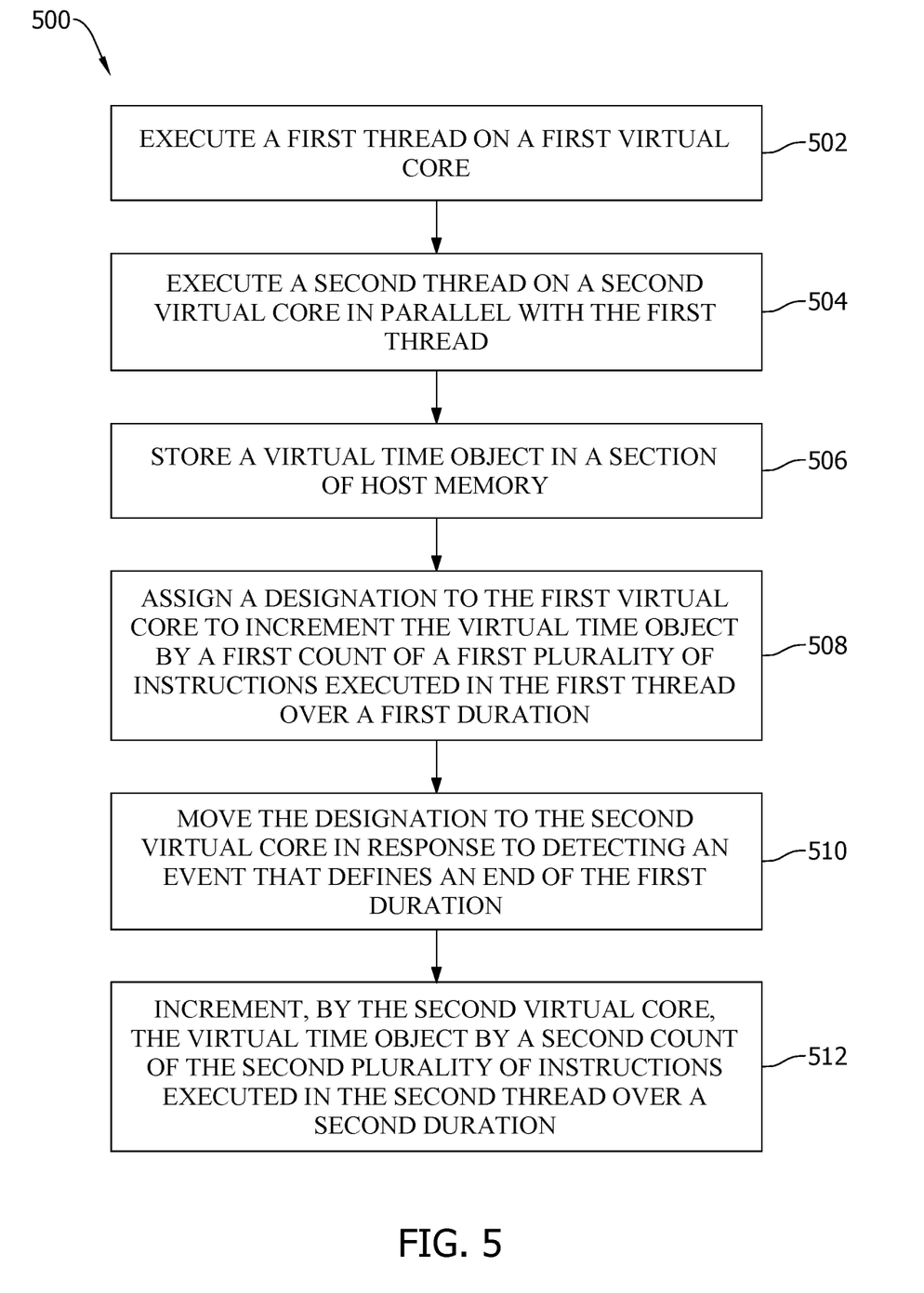
FIG. 5 is a flow diagram of an example method of tracking virtual time in a VM having a virtual multicore processor.

FIG. 5 is a flow diagram of an example method 500 of tracking virtual time in a VM having a virtual multicore processor, such as VM 410 and virtualized multicore processor 100 shown in FIGS. 4 and 1, respectively. A first virtual core, e.g., virtual core 0 102, executes 502 a first thread that includes a first plurality of instructions. A second core, e.g., virtual core N 104, executes 504 a second thread that includes a second plurality of instructions. A virtual time object 417 is stored 506 in a section of host memory shared between at least the first and second virtual cores. For example, as shown in FIG. 1, the virtual time object 417 may be stored in L3 cache 108, which is shared by virtual core 0 102 and virtual core N 104.

The VM assigns 508 a designation to the first virtual core to increment the virtual time object 417 by a first count of the first plurality of instructions executed in the first thread over a first duration. The designation is then moved 510 to the second virtual core in response to detecting an event that defines an end of the first duration. For example, the event may include an interrupt, the completion of execution of a section of code, e.g., a translation block, or the halting of the first virtual core. The second virtual core then increments 512 the virtual time object 417 by a second count of the second plurality of instructions executed in the second thread over a second duration. Virtual cores execute in parallel and only one virtual core updates virtual time.

In certain embodiments, method 500 includes mapping the shared cache, e.g., L3 cache 108, to a shared cache for a host multicore processor. In certain embodiments, method 500 includes reading, by the second virtual core, the virtual time object 417 during the first duration. The reading may be by an instruction in the second thread or, alternatively, by instruction from the VM.

An example technical effect of the methods, systems, and apparatus described herein includes at least one of: (a) tracking virtual time in a virtualized multicore processor executing multiple target code threads in parallel; (b) eliminating wall-clock synchronization of virtual time; (c) storing a virtual time object in a shared memory space without disrupting cache coherency; and (d) distributing timekeeping among the multiple virtual cores by moving the timekeeping designation on an event-driven basis.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in some embodiments, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A host computer for virtualizing a target multicore processor, the host computer comprising:
a host memory including a first section of memory storing a virtual time object, and a second section storing a virtual machine (VM), wherein the VM includes target code comprises a plurality of threads, wherein each thread includes a plurality of instructions configured to execute on the target multicore processor; and
a host central processing unit (CPU) configured to execute the VM to virtualize the target multicore processor, the VM configured to:
execute the plurality of threads in parallel on corresponding virtual cores, including a first thread having a first plurality of instructions executing on a first virtual core and a second thread having a second plurality of instructions executing on a second virtual core;
assign a designation to increment the virtual time object to the first virtual core;
increment, by the first virtual core, the virtual time object by a first count of the first plurality of instructions executed in the first thread over a first duration;
move the designation to increment the virtual time object to the second virtual core in response to detecting an event that defines an end of the first duration; and
increment, by the second virtual core, the virtual time object by a second count of the second plurality of instructions executed in the second thread over a second duration.

2. The host computer of claim 1, wherein the event is an interrupt.

3. The host computer of claim 1, wherein the event is completion of execution of a translation block in the first plurality of instructions.

4. The host computer of claim 1, wherein the second plurality of instructions executing on the second virtual core includes a read of the virtual time object during the first duration.

5. The host computer of claim 1, wherein the VM is further configured to periodically read the virtual time object to update at least one of an emulated counter or an emulated hardware timer in the VM.

6. The host computer of claim 1, wherein the plurality of instructions for each thread includes assembly instructions.

7. The host computer of claim 1, wherein the event is a halting of the first virtual core.

8. The host computer of claim 1, wherein the first section of the host memory is mapped to a shared cache level for storing the virtual time object.

9. A method of tracking virtual time in a virtual machine (VM) having a virtual multicore processor, the method comprising:
   executing a first thread on a first virtual core, wherein the first thread includes a first plurality of instructions;
   executing a second thread on a second virtual core in parallel with the first thread, wherein the second thread includes a second plurality of instructions;
   storing a virtual time object in a section of host memory;
   assigning a designation to increment the virtual time object to the first virtual core;
   incrementing, by the first virtual core, the virtual time object by a first count of the first plurality of instructions executed in the first thread over a first duration;
   moving the designation to increment the virtual time object to the second virtual core in response to detecting an event that defines an end of the first duration; and
   incrementing, by the second virtual core, the virtual time object by a second count of the second plurality of instructions executed in the second thread over a second duration.

10. The method of claim 9, further comprising detecting the event, wherein the event includes a halting of execution by the first virtual core.

11. The method of claim 9, wherein storing the virtual time object comprises storing the virtual time object in a section of random access memory (RAM).

12. The method of claim 9, further comprising reading, by the second virtual core, the virtual time object during the first duration.

13. The method of claim 9, further comprising reading, by the VM, the virtual time object to update at least one of an emulated counter or an emulated hardware timer in the VM.

14. The method of claim 9, further comprising detecting the event, wherein the event includes an interrupt.

15. The method of claim 9, further comprising detecting the event, wherein the event includes completing execution of a translation block of instructions of the first plurality of instructions.

16. A computer-readable memory storing a virtual machine (VM) having a plurality of virtual cores, the VM, upon execution by a host central processing unit (CPU), configured to:
   execute a first thread on a first virtual core of the plurality of virtual cores, wherein the first thread includes a first plurality of instructions;
   execute a second thread on a second virtual core, of the plurality of virtual cores, in parallel with the first thread, wherein the second thread includes a second plurality of instructions;
   store a virtual time object in a section of host memory;
   assign a designation to increment the virtual time object to the first virtual core;
   increment, by the first virtual core, the virtual time object by a first count of the first plurality of instructions executed in the first thread over a first duration;
   move the designation to increment the virtual time object to the second virtual core in response to detecting an event that defines an end of the first duration; and
   increment, by the second virtual core, the virtual time object by a second count of the second plurality of instructions executed in the second thread over a second duration.

17. The computer-readable memory of claim 16, wherein the VM is further configured, upon execution by the host CPU, to detect the event, wherein the event includes an interrupt.

18. The computer-readable memory of claim 17, wherein the VM is further configured, upon execution by the host CPU, to detect the event, wherein the event includes completion of execution of a translation block of target code.

19. The computer-readable memory of claim 16, wherein the VM is further configured, upon execution by the host CPU, to read, by the second virtual core, the virtual time object during the first duration.

20. The computer-readable memory of claim 16, wherein the VM is further configured, upon execution by the host CPU, to detect the event, wherein the event includes a halting of execution by the first virtual core.

* * * * *